United States Patent [19]

Kaito

[11] Patent Number: 5,316,226
[45] Date of Patent: May 31, 1994

[54] APPARATUS FOR WINDING A FILM CONDENSOR ELEMENT MATERIAL

[75] Inventor: Masao Kaito, Kyoto, Japan

[73] Assignee: Kaido Manufacturing Co., Ltd., Kyoto, Japan

[21] Appl. No.: 905,313

[22] Filed: Jun. 29, 1992

[30] Foreign Application Priority Data

Dec. 10, 1991 [JP] Japan ............... 3-113934[U]

[51] Int. Cl.$^5$ ............... B65H 23/025; H01G 13/02
[52] U.S. Cl. ............... 242/56.1; 242/7.13; 29/25.42
[58] Field of Search ............... 242/56.1, 7.13, 7.11; 29/25.42

[56] References Cited

U.S. PATENT DOCUMENTS

| | | | |
|---|---|---|---|
| 1,385,379 | 7/1921 | Kratz | 29/25.42 |
| 3,078,053 | 2/1963 | Duenke | 242/7.13 |
| 3,500,878 | 3/1970 | Moore | 242/7.13 |
| 3,858,285 | 1/1975 | Williams | 242/56.1 |
| 4,511,094 | 4/1985 | Kent | 242/56.1 |

*Primary Examiner*—Daniel P. Stodola
*Assistant Examiner*—John Q. Nguyen
*Attorney, Agent, or Firm*—Oblon, Spivak, McClelland, Maier & Neustadt

[57] ABSTRACT

An winding apparatus, particularly for winding a film condensor element material. The apparatus includes a plate jig having a winding axis, with the plate jig rotating as a pressing roller presses the film onto the plate jig. The pressing roller is mounted for rotation about a rotating axis with a spring disposed between the pressing roller and rotating axis, and with the pressing roller rotating in the same direction as the direction of rotation of the plate jig. As the plate jig rotates, the pressing roller travels along the plate jig to press the film condensor element thereon.

5 Claims, 4 Drawing Sheets

APPARATUS FOR WINDING A FILM CONDENSOR ELEMENT MATERIAL

BACKGROUND OF THE INVENTION (a) Field of the Invention

The present invention relates to an apparatus for winding a film condensor element material. More particularly, the present invention relates to an apparatus for winding a film condensor element material around a plate jig in the manufacture of a film condensor element.

(b) Description of the Prior Art

Heretofore, the film condensor element has been manufactured by winding an element material around the periphery of disc-like jig, after metalizing the side surface thereof, removing it from the jig by cutting any one place thereof to obtain a web-like mother material of an element, cutting the mother material to an appropriate size and connecting a lead wire to the both metallized side surfaces thereof.

The element so obtained is trapezoid in cross-section owing to the difference of length in outer and inner circumferences. In order to avoid the formation of such a trapezoid, it has been proposed to wind the material around a plate jig, but it is more inefficient in comparison with the case of using a disc jig.

SUMMARY OF THE INVENTION

An object of the present invention is to provide an apparatus for preparing an element mother material automatically and more efficiently than the prior apparatus using a disc jig by employing a plate jig in the manufacturing of a film condensor element.

DESCRIPTION OF THE PREFERRED EMBODIMENT

Figure 1:
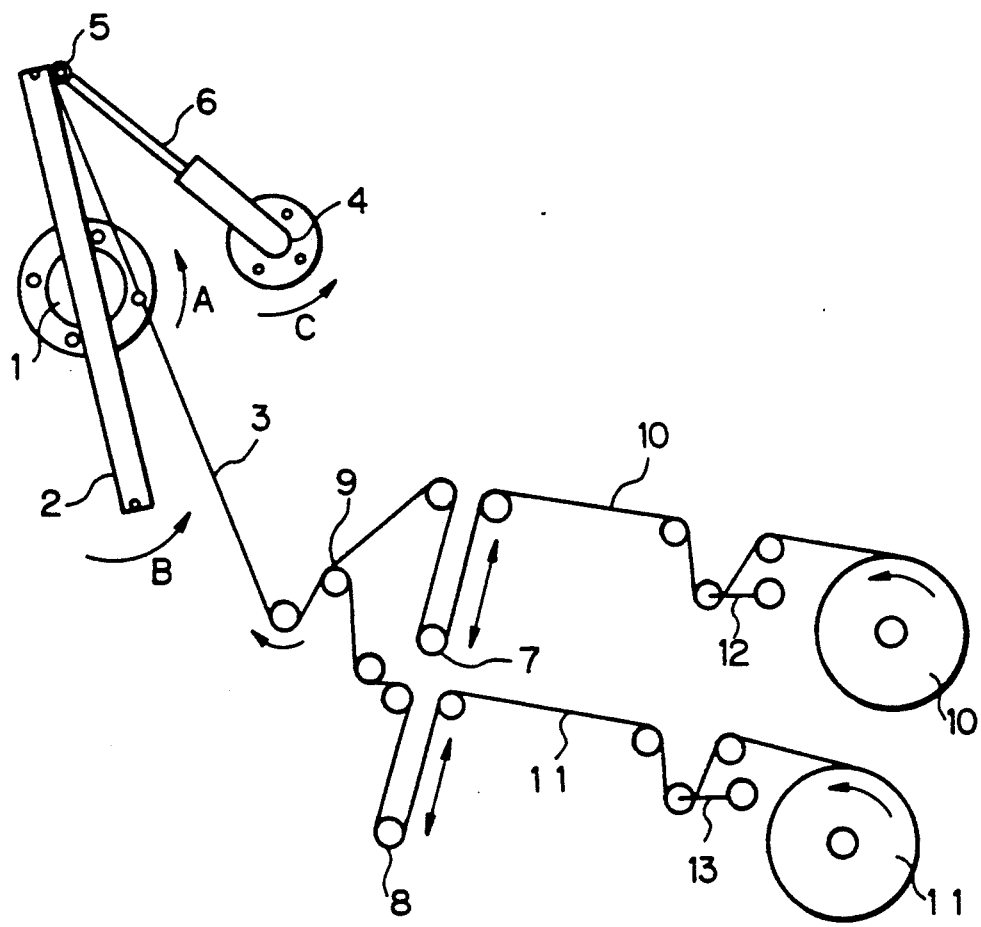
FIG. 1 is a figure showing the initial status of operation in the present apparatus.

As the result of applying himself to research for attaining the purpose, the present inventor has thought of winding a film to be wound on a plate jig fitted on the winding axis while pressing the film by a roller playing a circular motion for exhausting air, and has come to invent an apparatus for winding a film condensor element material, which comprises a plate jig 2 fitted at its central portion on a winding axis 1 and rotating together with said winding axis and a pressing roller 5 fitted its end on a pressing roller rotating axis 4 through an arm in the form of a pressure spring axis 6 and playing a circular motion with said fitted end as a center by said rotating axis. The apparatus is characterized in that the pressing roller rotating axis provides an axis 4 for rotation in the same direction in line with the rotating period of the winding axis 1 and a film condensor element material composed of at least two layers supplied through guiding rollers 7 and 8 and a combining roller 9 is pressed by the pressing roller 5 as it is winded on the surface of plate jig 2 in the longitudinal direction.

The operation of the present apparatus for winding a film condensor element material will be now explained with reference to the drawings.

Figure 2:
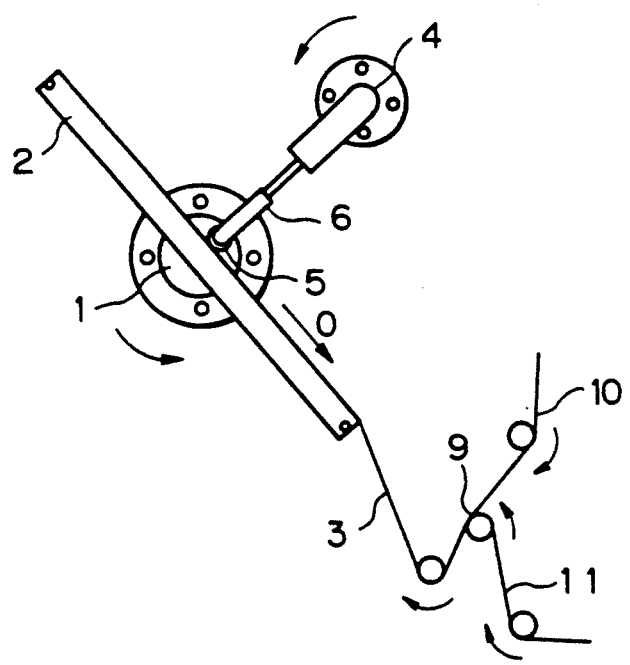
FIG. 2 is a figure showing the middle status of operation in the present apparatus.
Figure 3:
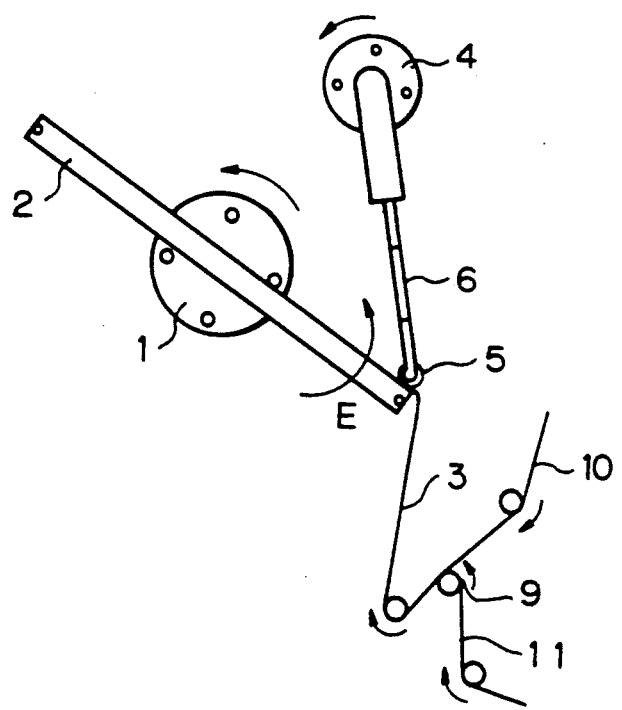
FIG. 3 is a figure showing the terminal status of operation in the present apparatus.

As the pressing roller rotating axis 4 rotates in line with the rotating period of the winding axis 1 at the desired ratio, the pressing roller 5 slides on the surface of plate jig 2 pressing the film condensor element material thereon through the pressure spring axis 6, and, operating in the order of from FIG. 1 to FIG. 2 and further to FIG. 3, the film condensor element material 3 is wound.

FIG. 1 is a figure showing the initial status of operation of the present winding apparatus. In the figure, as the rotating axis 1 rotates in the direction as shown by arrow A, the plate jig 2 rotates in the direction as shown by arrow B, the pressing roller rotating axis 4 rotates in the direction as shown by arrow C in line with the period of rotation of the rotating axis 1 and the pressing roller 5 slides in the direction as shown by arrow O on the surface of plate jig 2 through the pressure spring axis 6 to press the film condensor element material 3 thereon.

FIG. 2 shows the status in which the pressing roller 5 reaches almost the central portion of plate jig 2. The pressing roller 5 moves along the surface of plate jig 2 in the direction as shown by arrow O corresponding with the rotation of plate jig 2 to reach the status of FIG. 3.

In the status of FIG. 3, the pressing roller 5 presses the end of plate jig 2 and simultaneously the plate jig 2 rotates in the direction as shown by arrow E to come back to the status of FIG. 1.

The above operations are repeated.

Figure 4:
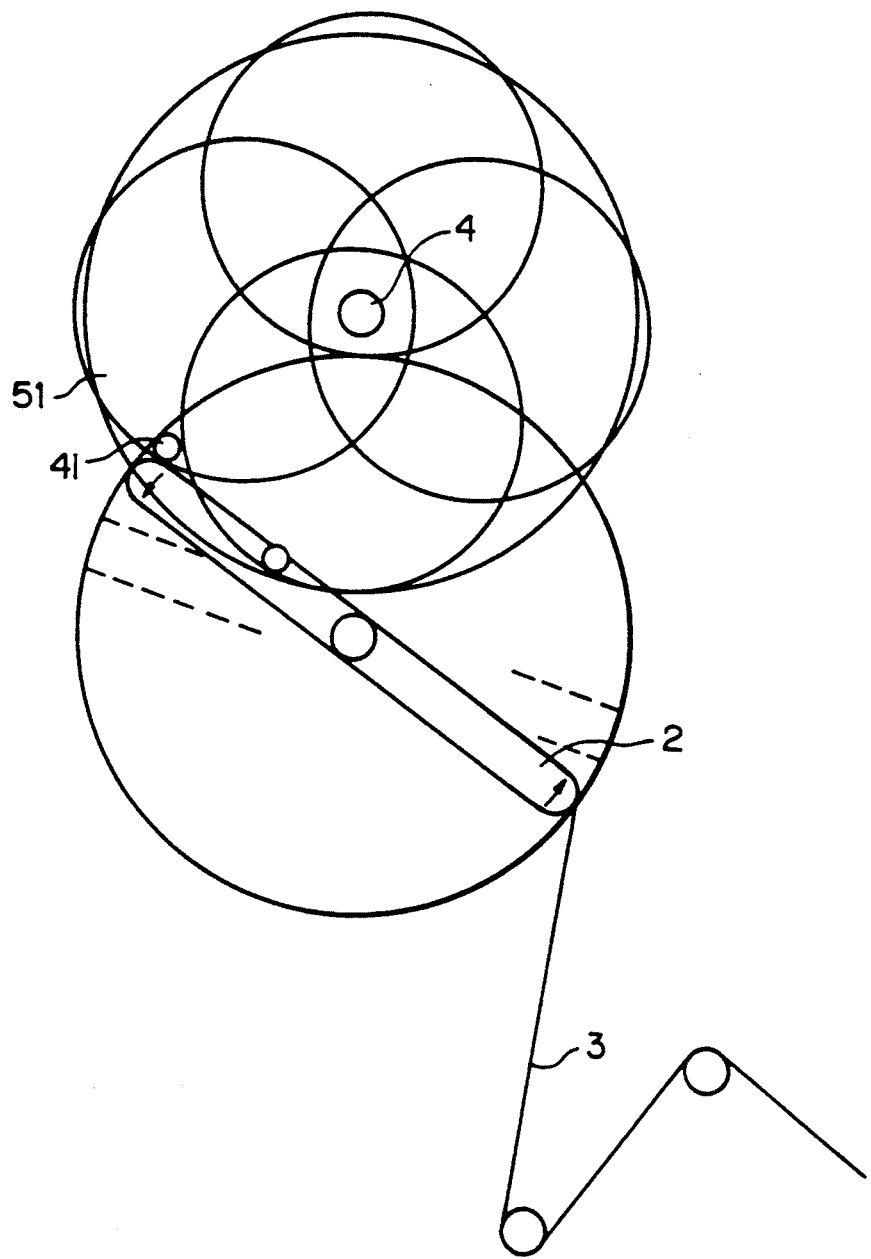
FIG. 4 is a figure showing the pressing state of pressing roller to the plate jig in case of using an eccentric disc type pressing roller in the apparatus of the present invention.

In the present apparatus, in place of using a pressing roller 5 fitted its end on a pressing roller rotating axis 4 through a pressure spring axis 6 and playing a circular motion with said fitted end as a center by said rotating axis, as shown in FIG. 4, by employing an eccentric disc type pressing roller 51 and fitting the eccentric point 41 on the pressing roller rotating axis 4, it is possible to press all circumference of plate jig 2 including the both ends without exception.

In order to absorb the slack of film material produced on the rotation of plate jig 2, guiding rollers 7 and 8 return-moving in the direction as shown by an arrow between the distance corresponding to the radius of plate jig 2 are provided between supplying rollers 10 and 11 and a combining roller 9. And step difference rollers 12 and 13 for auto-tension are provided for providing a given tension to the film material.

And the present winding apparatus can be established in the plural system by providing the winding axis, pressing roller, and the like on the respective common axis.

What is claimed is:

1. An apparatus for winding a film condensor element comprising a rotating plate jig, said rotating plate jig rotating in a first direction about a winding axis disposed at a central portion of said rotating plate jig;

a pressing roller assembly including a pressing roller mounted upon an arm, and means for rotating said arm in said first direction, wherein said pressing roller is urged against said plate jig to press the film condensor element against said plate jig as said film condensor element is wound upon said plate jig.

2. The apparatus of claim 1, wherein said arm includes a pressure spring for providing a spring pressure along a lengthwise direction of said arm for urging said pressing roller against said plate jig.

3. The apparatus of claim 2, wherein said rotating plate jig and said pressing roller assembly rotate in timed relation.

4. The apparatus of claim 1, wherein said arm rotates about a pressing roller assembly axis, and wherein said pressing roller assembly axis is spaced from said winding axis.

5. The apparatus of claim 4, further including film feeding means for feeding and combining two film layers, with said film layers combined prior to winding upon said rotating plate jig, and wherein said film feeding means is spaced from said rotating plate jig and said roller assembly.

* * * * *